Figure 1:
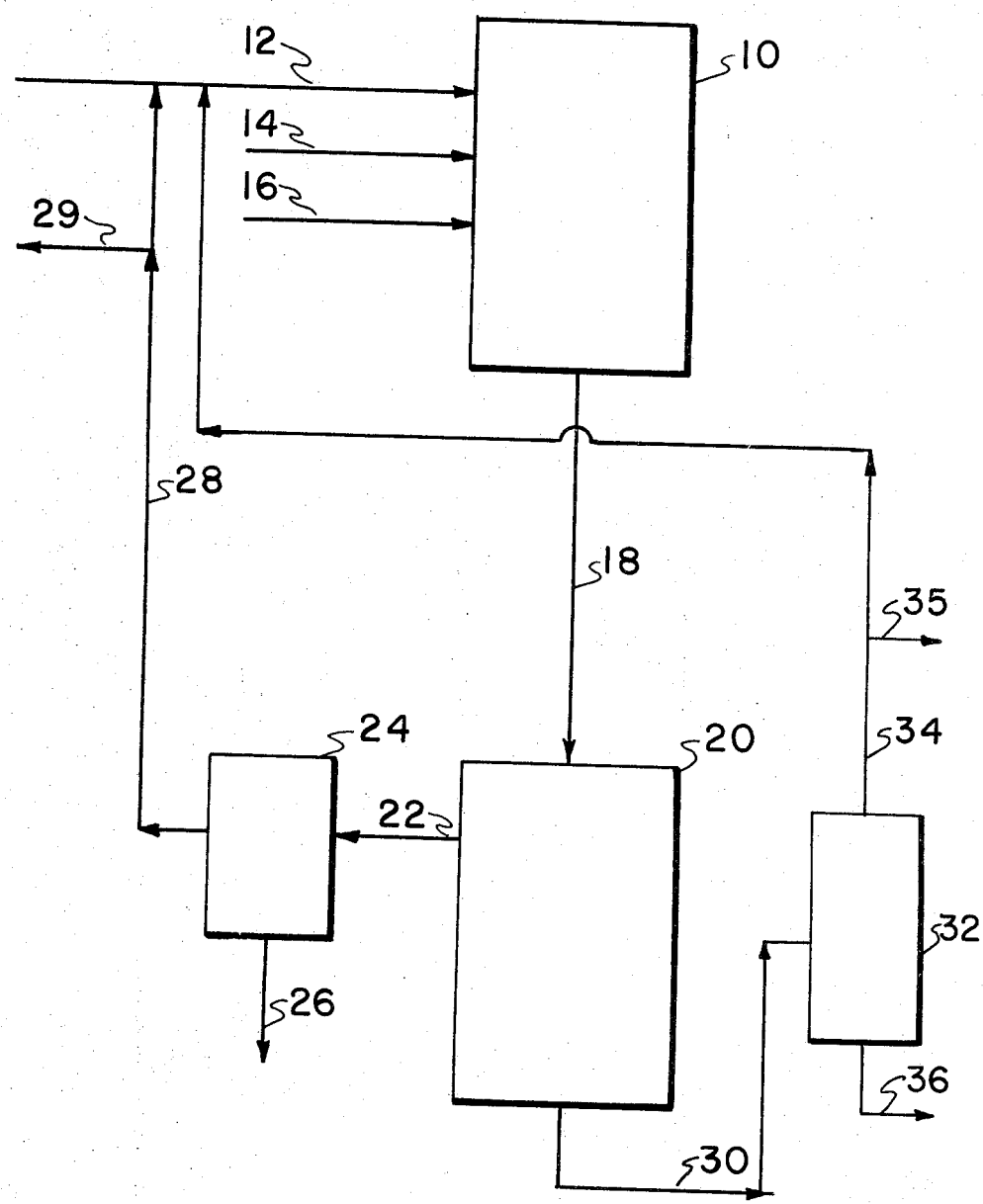

INVENTORS
H. D. ANSPON
G. E. HAM
W. H. BYLER

United States Patent Office 3,350,372
Patented Oct. 31, 1967

3,350,372
ETHYLENE/ACRYLATE ESTER COPOLYMERS
Harry D. Anspon, Kansas City, Mo., and William H. Byler, Overland Park, and George E. Ham, Leawood, Kans., assignors, by mesne assignments, to Gulf Oil Corporation, Pittsburgh, Pa., a corporation of Pennsylvania
Filed Jan. 6, 1964, Ser. No. 335,732
7 Claims. (Cl. 260—86.7)

This invention relates to copolymers of ethylene and acrylate esters and to processes for preparing same. This application is a continuation-in-part of our co-pending application Ser. No. 165,451, filed Jan. 10, 1963, and now abandoned which in turn is a continuation-in-part of our earlier application Ser. No. 50,882, filed Aug. 22, 1960, now abandoned.

While copolymers of ethylene and acrylate esters have been previously reported in the literature, e.g., see U.S. 2,200,429 and U.S. 2,953,551, such copolymers have had a very heterogeneous composition. When such prior art copolymers are fractionated by known techniques such as column elution techniques, it is observed that the fractions so recovered differ significantly from one another in the ratio of polymerized monomers contained therein. Frequently, the acrylate ester content of an isolated fraction may differ by as much as 80% or more from the acrylate ester content of the whole copolymer. In some cases, fractions can be recovered which contain almost no polymerized acrylate ester.

It has now been discovered that highly uniform ethylene-acrylate ester copolymers can be prepared by a continuous polymerization process in which ethylene, an acrylate ester and a free radical polymerization initiator are continuously introduced into a polymerization zone at a uniform rate while unpolymerized ethylene, unpolymerized acrylate ester and ethylene-acrylate ester copolymer are being continuously withdrawn from the polymerization zone at a uniform rate. The rates of monomer introduction and production withdrawal are set to be substantially identical so that the process is operated under equilibrium conditions. The reaction is carried out under conditions such that a uniform concentration of unreacted acrylate ester is maintained throughout the entire polymerization zone.

The ethylene-acrylate ester copolymers so obtained are highly uniform in composition and have the polymerized ethylene groups and the polymerized acrylate ester groups randomly distributed throughout the copolymer chains. "Highly uniform" as used herein means that when the copolymer is separated into ten percent weight fractions by a column elution technique (as described in J. Polymer Science 31, 453, (1958)) it will contain no ten percent weight fraction which differs in polymerized acrylate ester content by more than about 40% from the polymerized acrylate ester content of the whole copolymer. By way of specific example, when the copolymer contains 90% polymerized ethylene and 10% polymerized acrylate ester, each ten percent weight fraction of the copolymer will contain from 6 to 14 perment of polymerized acrylate ester. In most cases, the polymerized acrylate ester content of the ten percent weight fractions of the copolymer will differ from the polymerized acrylate ester content of the whole copolymer by less than 20% and in many by less than 10%. The ethylene-acrylate ester copolymers are further characterized, when containing at least 5 mol percent of acrylate ester, by being essentially amorphous and not exhibiting a first order transition when subjected to differential thermal analysis over the temperature range of about 50–170° C. The ethylene-acrylate ester copolymers also have a lower Major Pyrolyzate Index (subsequently described) than does a mixture of an ethylene homopolymer and an acrylate ester homopolymer having the same percentage of polymerized monomers. The method of determining Major Pyrolyzate Index and its significance in characterizing the copolymers of the invention will be subsequently described in greater detail.

Figure 2:
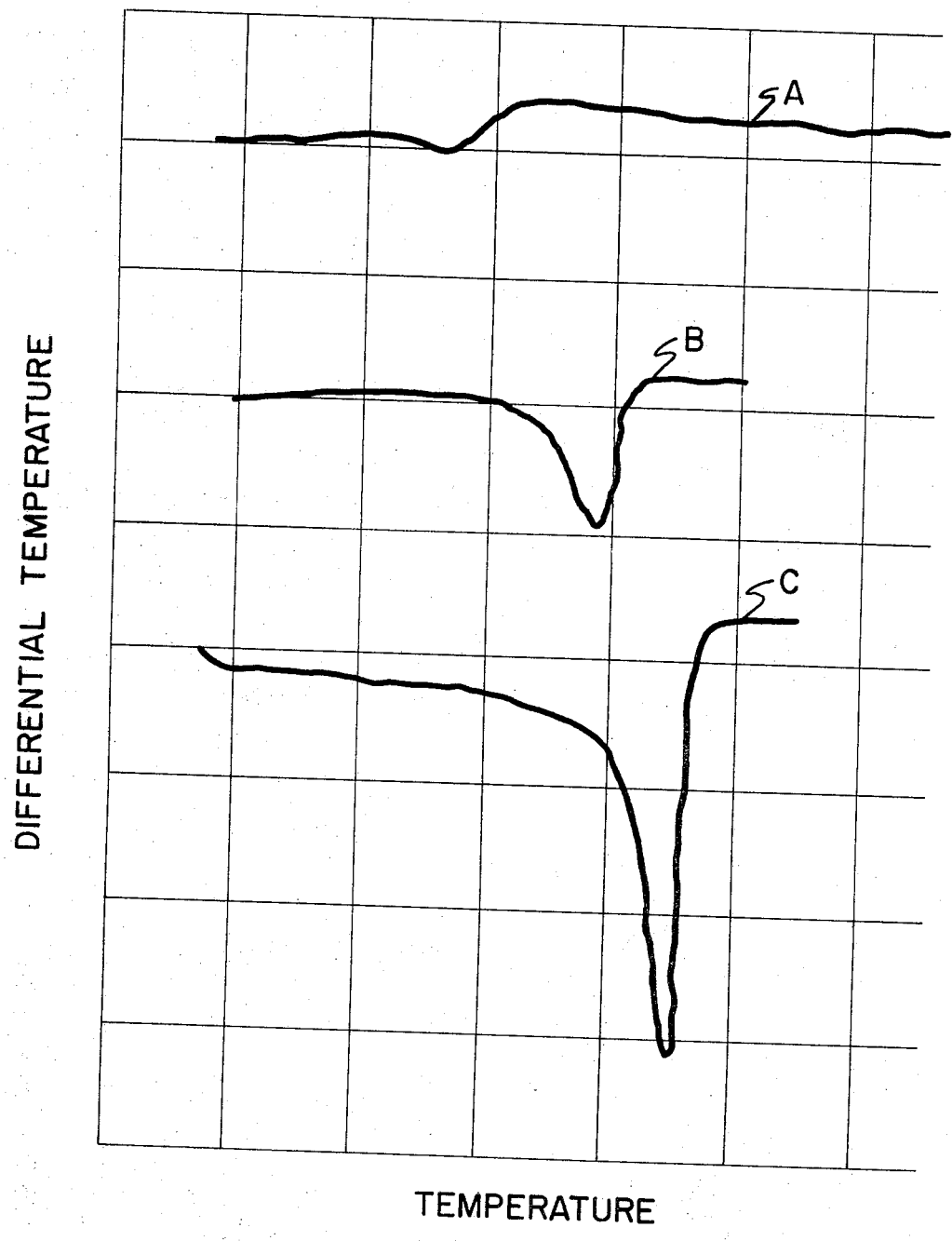
Figure 3:
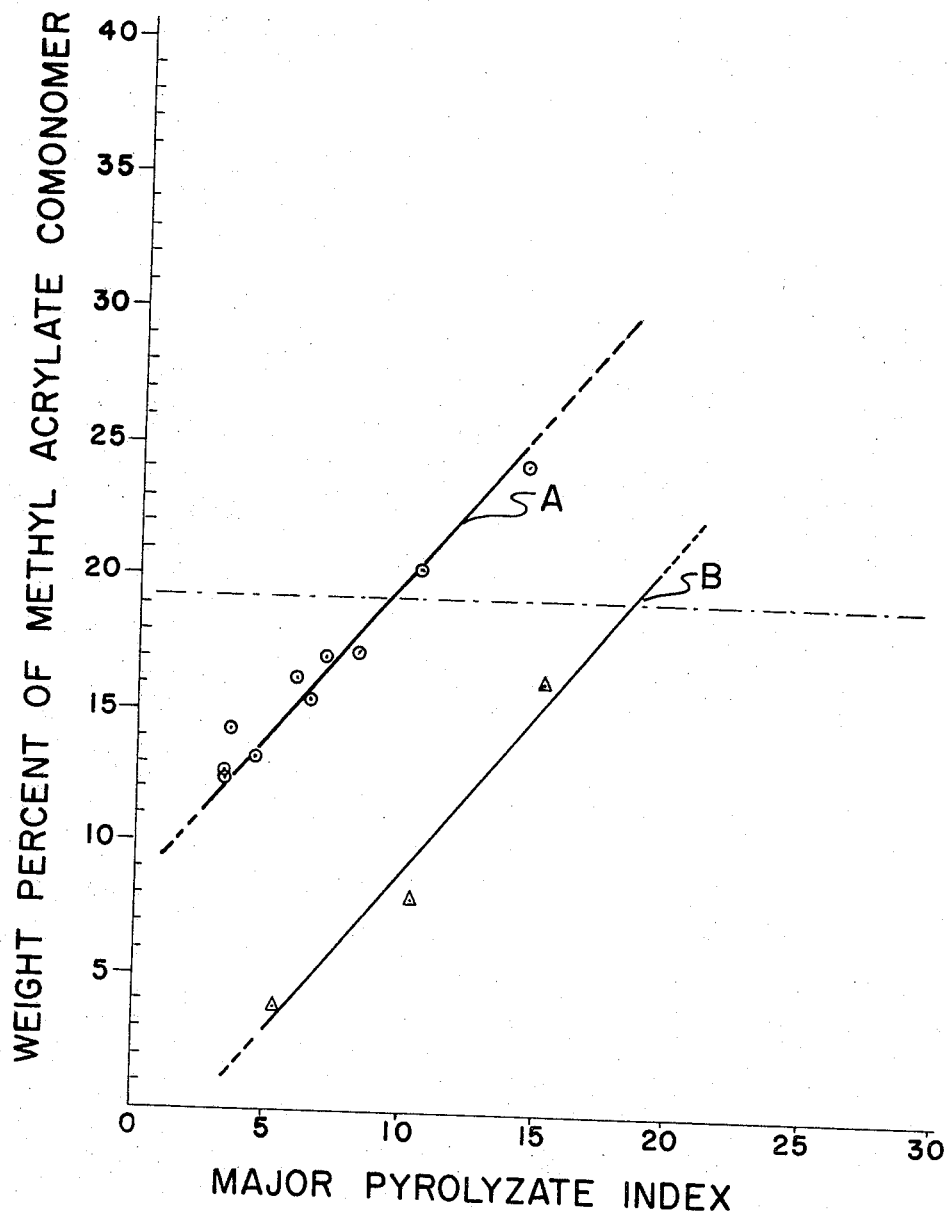

The nature of the invention will be more clearly understood from the following detailed description thereof when read in conjunction with the attached drawings in which:

FIG. 1 is a schematic diagram of one apparatus that can be used for carrying out the process of the invention;

FIG. 2 is a plot of the direction thermal analysis (DTA) of an ethylene-methyl acrylate copolymer of this invention as compared with the DTA curve of an ethylene-methyl acrylate copolymer prepared by the method of U.S. 2,200,429 and the DTA curve of polyethylene; and FIG. 3 is a plot of the Major Pyrolyzate Index (subsequently described) vs. acrylate ester content of certain ethylene-methyl acrylate copolymers of this invention.

The apparatus of FIG. 1 consists of an autoclave 10 of the type conventionally employed in the polymerization of ethylene and is fabricated from materials capable of operating safety at pressures of at least 50,000 pounds and at temperatures of up to at least 600° F. Autoclave 10 also will contain conventional accessory equipment such as a stirrer, a motor to drive the stirrer, safety pressure relief valves and an external jacket through which a heat-transfer liquid can be circulated for heating or cooling. As these elements are conventional and well-known in the art, they are not shown in the drawing. Lines 12, 14 and 16 are provided for feeding to autoclave 10, respectively, ethylene, an acrylate ester, and catalyst. The materials are fed through these lines by pumping means not shown.

Exit line 18 discharges material from autoclave 10 through a pressure let-down valve not shown into a conventional separator 20. Unreacted monomers and liquid products are flashed from separator 20 through line 22 into a second separator 24. Most products which are liquid at ambient temperature and pressures are condensed in separator 24 and are discharged through line 26. Unpolymerized ethylene is recovered through line 28 and is recirculated to line 12. A line 29 is provided off line 28 so that, if desired, a portion of the ethylene can be discharged from the system. Polymer from separator 20 is fed through line 30 to another separator 32. The polymer is discharged through line 36 and is fed to any desired type of downstream processing. Ethylene and possibly small quantities of acrylate ester are recovered through line 34.

In starting up the apparatus of FIG. 1, ethylene of approximately 99.9% purity is fed through line 12 to reactor 10 and polymerization is initiated by feeding catalyst, e.g., lauroyl peroxide dissolved in mineral oil, through line 16 into the reactor. After steady polymerization conditions have been established, an acrylate ester is fed through line 14 into reactor 10. The acrylate ester employed will have a high purity, and preferably will have an oxygen content of less than 20 parts per million. The flow of ethylene and acrylate ester into autoclave 10 is carefully controlled so that they enter autoclave 10 in a constant molar ratio. The rate of introduction of the ethylene and acrylate ester is also controlled so that they are introduced into the autoclave at the same rate that reactants are being discharged through line 18. Effective stirring is provided so that a uniform concentration of unreacted acrylate ester is provided throughout the reaction mass. The temperature of the polymerization mixture typically will be maintained within the range of 350°–450° F., and a polymerization pressure of the order of about 15,000–25,000 p.s.i. will be employed.

Reactants, consisting of ethylene-acrylate ester copolymer, unpolymerized ethylene, unpolymerized acrylate ester and small quantities of catalyst and catalyst carrier, are discharged at a constant rate through line 18. The reactants are fed to separator 20 which is maintained at a pressure on the order of 2,000 p.s.i. At the temperature and pressure prevailing in separator 20, virtually all of the components of the reaction mixture except the ethylene-acrylate ester copolymer are volatilized and fed through line 22 into a second separator 24 which is also maintained at a pressure of about 2,000 p.s.i.g. In separator 24, virtually all of the components (e.g., oils and waxes) except ethylene and acrylate ester are condensed and discharged through line 26. The quantity of acrylate ester monomer that remains in the liquid phase is so small as to be negligible. Unpolymerized ethylene and any small quantity of unpolymerized acrylate ester is removed from separator 24 through line 28 and is recycled to line 12 for reintroduction into autoclave 10. If desired, a portion of the unpolymerized ethylene can be vented through line 29 to prevent an undesired build-up of either inert gases or acrylate ester in the reaction system.

The ethylene-acrylate ester copolymer recovered in separator 20 is still in a molten state and is fed through line 30 to a low pressure separator 32 which is operated at a pressure of about 4 p.s.i.g. Dissolved gases, principally unpolymerized ethylene and any small quantity of acrylate ester, are vented through line 34 and are recycled to line 12 for reintroduction into autoclave 10. If desired, a portion of the unpolymerized ethylene can be vented through line 35 to prevent an undesired build up of either inert gases or acrylate ester in the reaction system.

The ethylene-acrylate ester copolymer recovered in separator 32 is still in a molten state and is fed through line 36 to any desired downstream processing station. Typically, the molten polymer will be fed to an extruder and extruded into a sheet which is then cut into cubes for packaging and shipping.

The following examples are set forth to illustrate more clearly the principle and practice of this invention to those skilled in the art. Unless otherwise noted, where parts or percentages are mentioned, they are parts or percentages by weight.

EXAMPLE I

An ethylene-methyl acrylate copolymer is prepared employing the apparatus illustrated in FIG. 1. The ethylene and methyl acrylate are fed into the reactor in a weight ratio of 98 parts of ethylene to 2 parts of methyl acrylate, which on a molar ratio represents 0.0065 mol of methyl acrylate per mol of ethylene. The monomers are charged to the reactor at a rate of 500 lbs./hr./cu. ft. of reactor volume. The ethylene charged to the reactor has a purity of about 99.9% and contains less than 10 parts per million of oxygen. The methyl acrylate charged to the reactor is free of inhibitors and its oxygen content is less than 20 parts per million. Lauroyl peroxide is employed as the free radical initiator and is dissolved in an equal weight of a 50–50 benzene-mineral oil vehicle. The initiator is introduced into the reactor at a rate of 750 parts per million, based upon the weight of monomers charged to the reactor. The polymerization is conducted at a pressure of 17,500 p.s.i. and the reaction temperature is maintained at about 360° F. Constant stirring is provided so that the concentration of unreacted methyl acrylate is maintained at a uniform level throughout the entire polymerization zone.

The reaction mixture is discharged from the reactor at a rate of 500 lbs./hr./cu. ft. of reactor volume. The downstream processing is carried out as previously described, i.e., the molten polymer is extruded as a ribbon into a water bath and cut into cubes of a convenient size for molding.

The ethylene-methyl acrylate copolymer that is obtained contains 0.054 mol of methyl acrylate per mol of ethylene. When restated on a weight percent basis, the copolymer contains 86% ethylene and 14% methyl acrylate. The polymer has the physical properties set forth in Table I.

TABLE I

| Property [1] | Value |
|---|---|
| Melt index | 1.72 |
| Density | 0.9365 |
| Vicat softening point ° C | 71 |
| Elongation at break percent | 690 |
| Film impact strength p.s.i | 2560 |
| Tensile at yield p.s.i | 492 |
| Tensile at break p.s.i | 1380 |

[1] All tests run by ASTM standards except as otherwise noted.

The copolymer has excellent resistance to low-temperature embrittlement, as evidenced by the fact that there are no failures among 15 parts tested at −72° C. by the method described in ASTM–D746–57T.

The copolymer has excellent resistance to environmental stress-cracking as evidenced by the fact that none of fifteen

TABLE II

| | Example II | Example III | Example IV | Example V | Example VI | Example VII | Example VIII |
|---|---|---|---|---|---|---|---|
| Reaction Conditions Employed: | | | | | | | |
| Acrylate Ester Employed | [4] MA | [4] MA | [6] MMA | [8] BMA | [9] BA | [10] SMA | [11] EHMA |
| Acrylate Ester/Ethylene Mol Ratio Charged to Reactor | 0.011/1 | 0.0074/1 | 0.0057/1 | 0.0061/1 | 0.0031/1 | 0.00084/1 | 0.0040/1 |
| Acrylate Ester/Ethylene Weight Ratio charged to Reactor | 3.3/96.7 | 2.2/97.8 | 2/98 | 3/97 | 1.4/98.6 | 1/99 | 2.75/97.25 |
| Catalyst Employed | [5] LP | [5] LP | [7] CP | [7] CP | [7] CP | [7] CP | [7] CP |
| Weight Catalyst Employed, p.p.m. Based on Monomers | 350 | 350 | 400 | 400 | 300 | | |
| Polymerization Pressure, p.s.i | 20,000 | 17,000 | 22,500 | 21,000 | 18,000 | 16,500 | 19,000 |
| Polymerization Temperature, ° F.[12] | 350 | 360 | 335 | 330 | 325 | 275 | 330 |
| Wt. Monomers charged lbs./hr./ft.³ of Reactor | 500 | 600 | | | | | |
| Polymer Properties: [1] | | | | | | | |
| Acrylate Ester Content, Mol per Mol of Ethylene | 0.109 | 0.04 | 0.016 | 0.018 | 0.009 | 0.016 | 0.014 |
| Acrylate Ester Content, Wt. Percent | 25 | 11 | 5.4 | 8.4 | 4.0 | 16 | 9 |
| Melt Index | 1.81 | 2.45 | 0.55 | 4.45 | 2.87 | 2.32 | 0.07 |
| Density | 0.9477 | 0.9350 | 0.9274 | 0.9219 | 0.9210 | 0.9199 | |
| Vicat Softening Point, ° C | 47 | 80 | 71 | 52 | 76 | 86 | 80 |
| Elongation at Break, Percent | | 700 | 700 | | 675 | 580 | 760 |
| Film Impact Strength, p.s.i | 3,100 | 2,400 | 3,280 | | 1,830 | 3,160 | 2,500 |
| Tensile at Yield, p.s.i | | | 760 | 720 | 630 | 1,010 | |
| Tensile at Break, p.s.i | | 1,952 | 1,590 | 755 | 1,275 | 1,200 | |
| Low Temperature Test, failures per 15 parts tested [2] | 0 | 0 | 1 | | 0 | 0 | 0 |
| Stress-Crack Resistance, failures in 5 days per 15 parts tested [3] | 0 | 0 | | | | | |

[1] All test run by ASTM methods unless otherwise noted.
[2] Tested at −72° C. by ASTM-D746-57T.
[3] Tested by ASTM-D-1693-60T using 30% Hostapal (HL).
[4] Methyl Acrylate.
[5] Lauroyl Peroxide.
[6] Methyl Methacrylate.
[7] Caprylyl Peroxide.
[8] Butyl Methacrylate.
[9] Butyl Acrylate.
[10] Stearyl Methacrylate.
[11] 2 Ethylhexyl Methacrylate.
[12] The reported temperature is the average temperature observed at the control point of the reactor.

parts tested fail in five days when tested by the method described in ASTM-D-1693-60T. The testing conditions used under this ASTM method are the most vigorous ones permitted, and the detergent solution employed is a 30% aqueous solution of Hostapal (HL), which is an alkylphenol-ethylene oxide condensate marketed by Farbwerke Hoechst A.G.

EXAMPLES II–VIII

A series of seven additional copolymerizations are run employing the general procedures described in Example I. Details of the reaction conditions employed and the properties of the copolymers thus obtained are set forth in Table II.

The ethylene-acrylate ester copolymers of this invention are ordinarily prepared in a manner analogous to that employed in the preparation of ethylene homopolymers, except that the ethylene monomer and the acrylate ester monomer are introduced into the reaction in a constant molar ratio and reactants are discharged from the reactor at the same rate that the monomers are charged to the reactor. The rate of introduction of acrylate ester monomer, the rate of polymerization (which is influenced principally by catalyst type, catalyst concentration, reactor pressure, and reaction temperature), and the residence time of the reactants in the reactor are all controlled so that a substantially uniform concentration of unpolymerized acrylate ester is continuously maintained throughout the entire reaction medium. Typically, the polymerization will be carried out in a high-pressure stirred autoclave with effective stirring being provided so that the acrylate ester is uniformly distributed throughout the entire reaction zone.

Alternatively, the reaction can be carried out in a tubular reactor. As stirring cannot be provided in a tubular reactor, the acrylate ester should be introduced to the reactor in a number of separate streams provided along the length of the tubes so that the concentration of the acrylate ester will be maintained at a substantially constant level throughout the entire reaction zone. This acrylate ester feeding procedure is required as the acrylate ester is consumed in the reaction at a faster rate than the ethylene. The location of the acrylate ester feed inlets and the rates of introduction to be used at each inlet can be easily established from a knowledge of the rates of reaction of the monomers under the polymerization conditions employed. Alternatively, sample streams can be taken off of the tubular reactor at various points so that the monomer concentrations at any section can be determined by analysis, e.g., by gas chromatography, which analytical data then can be used to make any necessary adjustments in the feed streams.

Typically, the copolymerizations will be run at pressures of the order of 10,000–40,000 p.s.i. and preferably of the order of 15,000–25,000 when the polymerization is carried out in a stirred autoclave. The temperatures employed can vary from about 200° F. up to the decomposition temperature of ethylene. Typically, the temperature will be set in the range of 200° F.–600° F. and preferably in the range of 300° F.–500° F. It is preferred that the reaction be run in the presence of a free radical polymerization initiator and in the absence of any added solvent other than minor quantities of catalyst carrier or telogenating agents.

The free radical polymerization initiators employed can be any of the common types employed in the homopolymerization of ethylene, such as the organic peroxides, e.g., lauroyl peroxide, ditertiary butyl peroxide, and tertiary butyl peracetate, and azo compounds such as α,α′ azobisisobutyronitrile and α,α′ azobisethylisobutyrate. Typically, the free radical polymerization initiator will be dissolved in a suitable organic liquid such as benzene, mineral oil or the like. Ordinarily, the free radical initiator will be used at a level of the order of 50 to 20,000 p.p.m. or preferably 100–250 p.p.m., based upon the monomers charged to the reactors.

The ethylene employed will be of the grade employed in the homopolymerization of ethylene. The acrylate ester employed may be a polymerization grade that has been freed of inhibitors and has an oxygen content of less than about 20 p.p.m. It has been observed that acrylate esters can be easily freed of dissolved oxygen by flushing the acrylate ester with ethylene gas.

The handling of such purified acrylate ester monomer at elevated temperatures and pressures may pose problems in polymerizing in the pumps and lines leading to the reactor. As an alternative procedure, a small quantity of an inhibitor (e.g., the methyl ether of hydroquinone) and/or oxygen may be added to the acrylate ester to prevent such premature polymerization. Such a procedure requires slight modifications in the polymerization zone. First, a slight increase may be required in the quantity of initiator charged to the reactor. Second, any oxygen introduced with the acrylate ester can act as a polymerization initiator. To prevent such oxygen from influencing the rate of polymerization, it may be desirable to charge to the polymerization zone a small quantity of an oxygen scavenger such as 2,6-ditertiarybutyl-4-methylphenol.

The acrylate ester employed in the invention will conform with the formula:

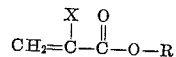

wherein X is selected from the group consisting of hydrogen and a methyl group and R is an alkyl group containing 1–22 atoms. Typical examples of suitable acrylate esters include methyl acrylate, butyl acrylate, 2-ethylhexyl acrylate, decyl acrylate, octadecyl acrylate and the corresponding esters of methacrylic acid.

The acrylate esters that are preferred for employment in the present invention are those in which the alcohol moiety of the acrylate ester is derived from a 1–4 carbon alkanol. It also has been observed that copolymers containing a methacrylate ester, as compared with copolymers containing a corresponding acrylate ester, have greater clarity and greater impact strength.

As earlier noted, the acrylate ester is consumed in the copolymerization reaction at a faster rate (relative to the ratio of the weights of monomers being charged) than the ethylene. It therefore follows that the acrylate ester must necessarily be charged to the polymerization reaction in a lower molar ratio than is desired in the final copolymer. Ordinarily, the acrylate ester will be charged at a ratio not greater than 0.035 mol per mol of ethylene and customarily will be charged in a ratio of 0.0006–0.020 mol per mol of ethylene or, more especially, in a ratio of 0.001 to 0.015 mol per mol of ethylene.

Although it is possible to prepare uniform ethylene-acrylate ester copolymers over a wide range of molar ratios of combined ethylene and acrylate ester, the preferred copolymers of the invention ordinarily will contain a maximum of 0.5 mol of acrylate ester per mol of ethylene, i.e., 33 mol percent acrylate ester. The copolymers ordinarily will contain at least 1 mol percent of the acrylate ester and preferably will contain 0.025–0.20 and more especially 0.05 to 0.15 mol of acrylate ester per mol of ethylene.

The copolymers of this invention are useful for many purposes which will be apparent from the description of the physical properties set forth earlier in the specification. For example, the copolymers can be fabricated into films having excellent impact strength. Because of their strength and elasticity they are particularly useful in the manufacture of drug sundries such as surgeon's gloves and the like. The copolymers can be injection molded into numerous consumer items such as detergent bottles, ice cube trays, and the like. The copolymers can be blended with polypropylene to improve the low temperature impact strength thereof as disclosed in the copending application of George E. Ham, Jr., William H. Byler and Sylvester P. Horkowitz, Ser. No. 319,994, filed Oct. 30, 1963, and assigned to the assignee of the present application.

One of the outstanding characteristics of the copolymers of the invention is that they retain their excellent physical properties even when loaded with large volumes of inert inorganic fillers. For example, when the copolymers of the invention are loaded with 30–150 parts of iron oxide per 100 parts of copolymer, there is obtained an excellent gasket material which is magnetically susceptible and can be used in the fabrication of gaskets for refrigerator door liners that are to be sealed by magnets placed within the refrigerator panel adjacent to the gasket material. In a somewhat similar manner, copolymers of the invention that are loaded with 20–65%, preferably 30–40% (based on the total composition) of carbon black have remarkably good physical properties, even at temperatures as low as −50° C. or even lower. If a conductive black such as an acetylene black is used, the compositions are semiconductive and can be used as an outer sheath in lieu of metal on certain types of electrical cables. Other inorganic fillers that can be used to heavily load the copolymers of the invention include, among others, aluminum oxide, asbestos, calcium oxide, clay, barium sulfate, silica, zinc oxide, magnesium oxide, titanium dioxide and calcium carbonate. Most such fillers will be used in the range of 5–60% of the total composition although a preferred range is of the order of 10–50% of the total composition.

Throughout the balance of this specification, descriptions will be made of techniques for distinguishing the copolymers of the invention from ethylene-acrylate ester copolymers prepared by prior art methods.

COMPARATIVE EXAMPLE I

(Part A)

To provide a sample of an ethylene-methyl acrylate copolymer typical of the copolymers previously known, an ethylene-methyl acrylate copolymer is prepared following the procedure described in Example 9 of U.S. 2,200,429. The reactor employed is a 250 ml. Magne-Dash reactor. The ethylene employed contains 0.04% oxygen which functions as the polymerization initiator. Thirty ml. of methyl acryate is charged to the cool reactor and ethylene is then charged to build the pressure up to 10,000 p.s.i. The autoclave is then heated to 395° F. and polymerization is continued at this temperature for 20 hours. The average pressure obtained throughout the reaction is 28,000 p.s.i. The copolymer is recovered and contains 31 weight percent combined methyl acrylate.

(Part B)

Part A is repeated except that only 10 ml. of methyl acrylate is charged to the reactor and the reaction is stopped after 15 hours. The copolymer is recovered and contains 6 weight percent combined methyl acrylate.

(Part C)

Part B is repeated except for two changes that are made. First, only 5 ml. of methyl acrylate is charged to the reactor. Second, when the reaction temperature has reached 392° C. the reactor pressure has increased to only 17,500 p.s.i. At this point, additional ethylene is charged to the reactor to build the total pressure to 28,000 p.s.i. Polymerization is continued for 14 hours. The copolymer is recovered and contains 19.5 weight percent methyl acrylate.

(Part D)

Part C is repeated except that 7 ml. of methyl acrylate is initially charged into the reactor. The copolymer that is recovered contains 19.2 weight percent methyl acrylate.

(Part E)

Part C is repeated except that the methyl acrylate is replaced with 10 ml. of methyl methacrylate and the reaction time is reduced to 12 hours. The copolymer obtained contains 8.7 weight percent combined methyl methacrylate.

The homogeneity of the copolymers of the invention can be demonstrated by separating the whole copolymer into 10 percent weight fractions by a column elution technique essentially identical (except where otherwise specified) with that described by Francis, Cooke and Elliott (Journal of Polymer Science 31, 453 (1958)). The apparatus employed is that described by R. A. Mendelson, J. Polymer Science, Part A, vol. 1, pp. 2361–2369, (1963). The technique employed herein differs from that of Francis, Cooke and Elliott only in two important respects. First, in the present work, ethylene copolymers are fractionated whereas Francis et al. fractionated various polyethylene resins. Second, in the present work the elution is carried out at a temperature of 80° C. (maintained by jacketing the column with refluxing benzene).

The apparatus employed consists of a silica column affixed on top of a soxhlet device. As earlier noted, the silica column is jacketed so that it can be heated to 80° C. with refluxing benzene. Conventional accessory equipment is provided so that nitrogen pressure can be maintained within the soxhlet device so as to maintain (when desired) a fixed liquid level in the silica column.

In carrying out the separations, the column is first packed with 80–120 mesh silica and heated to 80° C. The silica column is then flooded with a 1:1 mixture of para-xylene (para-xylene is used throughout this work and all subsequent reference to xylene will be understood to refer to this specific isomer) and 2-ethoxyethanol. The xylene-2-ethoxyethanol mixture is then displaced from the silica column with a hot xylene solution of the copolymer that is to be fractionated. When the level of the solution drops just below the top of the silica, nitrogen pressure is applied to the soxhlet device to maintain the polymer solution within the silica column. The xylene solution is then cooled to room temperature to precipitate the copolymer on the silica. The nitrogen pressure is released and the cold xylene is displaced from the column with cold ethoxyethanol. The ethoxyethanol is then held in the silica column by nitrogen pressure and heated to 80° C. The nitrogen pressure is then released and the copolymer is eluted with 18 successive aliquots of a xylene-ethoxyethanol solvent mixture. The xylene content (in volume percent) of the aliquots is respectively 20, 30, 40, 45, 50, 53, 56, 58, 60, 62, 63, 64, 65, 66, 67, 68, 70 and 100.

Each of the aliquots that is collected is cooled to room temperature and mixed with 3 volumes of methanol to precipitate the copolymer. The recovery of the copolymer is substantially quantitative. The samples are combined (in the order collected) to give samples representing substantially 10 percent weight fractions of the copolymer sample originally precipitated on the silica. The combined samples are then analyzed for acrylate ester content.

A series of ethylene-methyl acrylate copolymers prepared by a method analogous to Example I and containing 20 weight percent methyl acrylate are fractionated by the column elution method above described. The first 10 percent weight fractions contain 20–23% methyl arcylate. The second 10 percent weight fractions contain 20–22% methyl acrylate. The third through the ninth 10 percent weight fractions contain 19–21% methyl acrylate. The tenth 10 percent weight fractions contain 18–20% methyl acrylate.

In a similar manner, a series of ethylene-methyl acrylate copolymers prepared by a method analogous to Example I and containing, respectively, 15 weight percent and 25 weight percent methyl acrylate are fractionated. None of the recovered 10 percent weight fractions differ from the methyl acrylate content of the whole copolymer by more than ±20%. Invariably, the largest differences are observed in the first and the tenth precent weight fractions. The analyses of the third through the ninth fractions will, within the experimental error of analysis, be virtually identical with the methyl acrylate content of the whole copolymer.

In contrast to these results, when the copolymers prepared in the Comparative Example are fractionated by the column elution technique, there are major differences in the acrylate ester content of the recovered fractions. In all cases, the first 10 percent weight fraction will have an acrylate ester content substantially greater than the acrylate ester content of the whole copolymer. The tenth 10 percent weight fraction in all cases will have an acrylate ester content substantialy less than the whole copolymer. Moreover, with any of these copolymers, there is a constantly lower percent of acrylate ester content as one analyzes the second through the ninth 10 percent weight fraction. These results clearly establish that the prior art ethylene-acrylate ester copolymers are extremely heterogeneous in composition.

Differential thermal analysis of the copolymers of this invention and the ethylene-acrylate ester copolymers of the prior art can be used to establish differences in the structure of the two types of copolymers.

FIG. 2 shows a DTA Curve for a typical ethylene-methyl acrylate copolymer (containing 20% methyl acrylate) of this invention (identified as Curve A), as compared to a DTA Curve of an ethylene-methyl acrylate copolymer prepared by Part C of Comparative Example I (identified as Curve B) and a DTA Curve of polyethylene (identified as Curve C) produced by a high pressure autoclave process analogous to that employed in preparing the copolymers of the invention. The procedure and apparatus employed to obtain the curves are described in the chapter beginning on page 361 in Organic Analysis, vol. 4, published by Interscience Publishers, Inc. (1960); this chapter written by Bacon Ke is entitled "Application of Differential Thermal Analysis to High Polymers." In obtaining the curves illustrated, the temperature was raised at a rate of 2.4° C. per minute over a temperature range of 50–170° C.

Curve C contains a very marked discontinuity which illustrates that a first order (melting) transition is taking place. This first order transition represents melting of the crystalline phase of polyethylene. Curve B exhibits a similar discontinuity typical of a first order transition, although not as marked as in Curve C. The most probable explanation of this discontinuity is that the prior art ethylene-methyl acrylate copolymer contains polymer chains having a substantial number of polymerized ethylene units linked together which are capable of crystallizing in a manner analogous to polyethylene. The very minor discontinuity in Curve A is indicative only of a second order transition without any indication of a first order transition. The most logical interpretation of this curve is that the ethylene-methyl acrylate copolymer of this invention does not contain polymer chains having a sufficient number of uninterrupted polymerized ethylene units to crystallize in a manner analogous to polyethylene. This evidence shows that, in the copolymers of the invention, the polymerized methyl acrylate groups are distributed substantially uniformly throughout all of the polymer chains.

The characterization of the structure of the ethylene-acrylate ester copolymer of this invention by differential thermal analysis is most clearly shown with copolymers containing at least 5 mol percent of the acrylate ester. When a smaller quantity of the acrylate ester is present, a sufficient number of polymerized ethylene units can be linked together to provide a small, but measurable first order transition in the uniform copolymers of the invention.

The ethylene-acrylate ester copolymers of this invention also can be distinguished from the ethylene-acrylate ester copolymers of the prior art by measuring their resistance to environmental stress-cracking as determined by the method described in ASTM–D–1693–60T. As noted in the examples, when the copolymers of this invention are tested under the most vigorous conditions permitted by this ASTM method, there is seldom any failure among 15 parts tested over a 5-day period. By way of distinct contrast, when the prior art copolymers illustrated in the Comparative Example are tested by this same method, usually at least 50% of the tested parts will fail within 24 hours.

Thermal degradation of ethylene-acrylate ester copolymers also can be used to distinguish the copolymers of this invention from the ethylene-acrylate ester copolymers of the prior art. More specifically, when the copolymers are thermally degraded as described by Karl J. Bombaugh, C. E. Cook and B. H. Clampitt, "Investigation of Copolymer Distribution in Ethylene-Acrylate Copolymers With Thermal Methods," Analytical Chemistry, 35, No. 12, p. 1834 (1963), the Major Pyrolyzate Index (as therein defined) can be used to distinguish uniform ethylene-acrylate ester copolymers from the non-uniform ethylene-acrylate ester copolymers of the prior art.

The Major Pyrolyzate Indexes (MPI), defined by Bombaugh et al., supra, of a series of ethylene-methyl acrylate copolymers of this invention are determined and plotted against the weight percent of methyl acrylate contained in the copolymers. This curve is identified as Curve A in FIG. 3. The best plot of the experimental data, over a range of 10–30% methyl acrylate content, can be represented by the formula:

(A) MPI=0.8 (wt. percent methyl acrylate)—6

It has been empirically observed that the Major Pyrolyzate Index of the copolymers of this invention can be defined by the following formula:

(B) MPI=[0.8 (wt. percent methyl acrylate)—6]±3

Also shown in FIG. 3 is Curve B which is a plot of Major Pyrolyzate Index vs. weight percent of methyl acrylate in blends of ethylene homopolymers with methyl acrylate homopolymers. It is apparent from a mere inspection of the two curves that there are major differences in the thermal degradation profiles of the copolymer of this invention as compared with a mixture of homopolymers of the two monomer species. When the prior art copolymers of Parts A, C and D of the Comparative Example are subjected to thermal degradation, they have Major Pyrolyzate Indexes which fall either on or close to Curve B and fall outside of the value that would be calculated by Formula B above.

The method can be used to distinguish between uniform and heterogeneous ethylene copolymers of higher esters of acrylic acid, but with these copolymers it may be necessary to first convert the acrylate ester moiety to the methyl ester by an ester interchange reaction.

The above descriptions and particularly the examples are set forth for purposes of illustration only. Many variations and modifications thereof will be apparent to those skilled in the art and can be made without departing from the spirit and scope of the invention herein described.

What is claimed is:

1. A highly uniform copolymer having polymerized therein about 67–99 mol percent ethylene and, correspondingly, about 33–1 mol percent of an acrylate ester, said polymerized ethylene groups and polymerized acrylate ester groups being randomly distributed throughout the copolymer chains, said copolymer, when separated into ten percent weight fractions by a column elution technique employing a variable p-xylene-2-ethoxyethanol eluant, having no ten percent weight fraction which differs in polymerized acrylate ester content by more than about 40% from the polymerized acrylate ester content of the whole copolymer, said copolymer having a 50% survival rate for at least 24 hours in the bent-strip environmental stress-crack test (ASTM–D–1693–60T), said acrylate ester conforming to the formula:

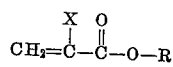

wherein X is selected from the group consisting of hydrogen and a methyl group and R is an alkyl group containing 1-22 carbon atoms; said copolymer having been made by a free-radical initiated polymerization of a mixture of ethylene and an acrylate ester of a formula set forth above.

2. A copolymer of claim 1 in which the copolymer, when separated in 10 percent weight fractions by a column elution technique employing a variable p-xylene-2-ethoxyethanol eluant, has no 10 percent weight fraction which differs in polymerized acrylate ester content by more than about 20% from the polymerized acrylate ester content of the whole copolymer.

3. A copolymer of claim 2 in which the acrylate ester polymerized therein is methyl acrylate.

4. A copolymer of claim 2 in which the acrylate ester polymerized therein is methyl methacrylate.

5. A copolymer of claim 2 in which the acrylate ester polymerized therein is butyl acrylate.

6. A copolymer of claim 2 which contains in polymerized form at least 5 mol percent of the acrylate ester and does not exhibit a first order transition when subjected to a Differential Thermal Analysis over the range of 50–170° C.

7. A copolymer of claim 6 in which the polymerized acrylate ester moiety is an ester of acrylic acid and the copolymer has a Major Pyrolyzate Index (MPI) defined by the equation:

$$MPI = [0.8 \text{ (wt. percent methyl acrylate)} - 6] \pm 3$$

References Cited

UNITED STATES PATENTS

| | | | |
|---|---|---|---|
| 2,388,169 | 10/1945 | McAlevy | 260—41 |
| 2,405,962 | 8/1946 | Larson et al. | 260—86.7 |
| 2,953,541 | 9/1960 | Pecha et al. | 260—86.7 |
| 2,953,551 | 9/1962 | White | 260—86.7 |

JOSEPH L. SCHOFER, *Primary Examiner.*

MORRIS LIEBMAN, *Examiner.*

H. WONG, K. B. CLARKE *Assistant Examiners.*